(12) United States Patent
Vanbrabant et al.

(10) Patent No.: US 12,327,130 B2
(45) Date of Patent: Jun. 10, 2025

(54) SYSTEM AND METHOD FOR CONFIGURING A LARGE-SCALE DISTRIBUTED INFRASTRUCTURE

(71) Applicant: INMANTA N.V., Leuven (BE)

(72) Inventors: Bart Vanbrabant, Tielt-Winge (BE); Wouter De Borger, Leuven (BE); Stefan Walraven, Leuven (BE)

(73) Assignee: INMANTA NV, Leuven (BE)

( * ) Notice: Subject to any disclaimer, the term of this patent is extended or adjusted under 35 U.S.C. 154(b) by 589 days.

(21) Appl. No.: 17/767,479

(22) PCT Filed: Oct. 9, 2020

(86) PCT No.: PCT/EP2020/078450
§ 371 (c)(1),
(2) Date: Apr. 8, 2022

(87) PCT Pub. No.: WO2021/069683
PCT Pub. Date: Apr. 15, 2021

(65) Prior Publication Data
US 2023/0125626 A1    Apr. 27, 2023

(30) Foreign Application Priority Data
Oct. 11, 2019   (BE) .................................. 2019/5684

(51) Int. Cl.
*G06F 9/455* (2018.01)
*G06F 9/448* (2018.01)
(52) U.S. Cl.
CPC ........ *G06F 9/45558* (2013.01); *G06F 9/4498* (2018.02); *G06F 2009/4557* (2013.01)

(58) Field of Classification Search
None
See application file for complete search history.

(56) References Cited

U.S. PATENT DOCUMENTS 10,990,887 B1 *  4/2021  Bray ...................... G06N 5/027
11,961,006 B1 *  4/2024  Dikhit ...................... G06N 3/08
(Continued)

FOREIGN PATENT DOCUMENTS

EP          3550433 A1      10/2019

OTHER PUBLICATIONS

L. T. Udovičić and N. Tanković, "Dew-Based Service Orchestration Model for Systems Spanning Multiple Computing Layers," 2021 44th International Convention on Information, Communication and Electronic Technology (MIPRO), Opatija, Croatia, 2021, pp. 1711-1716. (Year: 2021).*

(Continued)

*Primary Examiner* — Frank D Mills
(74) *Attorney, Agent, or Firm* — Pillsbury Winthrop Shaw Pittman, LLP

(57) ABSTRACT

An orchestration system and method for configuring a large-scale distributed infrastructure including multiple subsystems. An orchestration model with pre-defined modules is provided for implementing desired states in the distributed infrastructure. Some modules of the orchestration model are coupled to a multi-state finite state machine including a list of desired states. A dynamic state transition of at least one finite state machine from one desired state to another is performed, in response to one or more detected events triggering a transition condition.

15 Claims, 6 Drawing Sheets

(56) References Cited

U.S. PATENT DOCUMENTS

2012/0271927 A1    10/2012  Shakirzyanov et al.
2018/0083828 A1*    3/2018  Cartaya ............... H04L 41/0895
2021/0165690 A1*    6/2021  Mohalik ............... H04L 67/125

OTHER PUBLICATIONS

International Search Report dated Nov. 5, 2020, issued in corresponding International Application No. PCT/EP2020/078450 (3 pgs.).
Written Opinion of the International Searching Authority dated Nov. 5, 2020, issued in corresponding International Application No. PCT/EP2020/078450 (7 pgs.).
Michael Caragiozidis et al., "Design Methodology for a Modular Component based Software Architecture", Annual IEEE International Computer Software and Applications Conference, 2008, pp. 1122-1127.
Suhrid Satyal et al., "Rollback Mechanisms for Cloud Management APIs using AI planning", IEEE Transactions on Dependable and Secure Computing, Jan. 1, 2017, pp. 1-14.
Faiez Zalila et al., "A Model-Driven Tool Chain for OCCI", Oct. 20, 2017, Pervasive: International Conference on Pervasive Computing (Lecture Notes in Computer Science; Lect. Notes Computer), Springer, Berlin, Heidelberg, pp. 389-409.

* cited by examiner

SYSTEM AND METHOD FOR CONFIGURING A LARGE-SCALE DISTRIBUTED INFRASTRUCTURE

CROSS-REFERENCE TO RELATED APPLICATIONS

This application is a national stage entry of PCT/EP2020/078450, filed Oct. 9, 2020, which claims priority to Netherlands Application No. BE 2019/5684, filed Oct. 11, 2019, the contents of each of which are herein incorporated by reference in their entireties.

FIELD OF THE INVENTION

The invention relates to a method and system for configuring and/or orchestrating a large-scale distributed infrastructure including multiple subsystems. The invention further relates to changing of configuration due to adaptation, e.g. in response to network events.

BACKGROUND TO THE INVENTION

Large-scale distributed systems are typically used by companies such as Microsoft, Google, Facebook, Twitter, etc. providing large scale digital services on which many users rely extensively. Furthermore, companies such as Oracle, Amazon, SAP, SalesForce, etc. also provide large scale software products and services on which many enterprises rely for their day to day operations. Almost all enterprises rely on software systems to function for their day to day activities, such as banks, retailers, government and even production companies. The computer implemented systems have become ubiquitous and are becoming more complex as they depend on many other software and services.

The ongoing rise of the cloud computing paradigm increases the management challenge because it allows distributed systems to quickly scale by deploying additional nodes. They can evolve dynamically to very large sizes and in addition they dynamically scale down when load decreases to reduce operational costs. Cloud computing increases the scale and the dynamics of distributed software systems in many ways, as well as the pace of configuration updates operators need to keep up with.

The computer implemented products and services tend to fail frequently and the cost of the resulting downtime is relatively high. Often the failures are caused by configuration errors. This is a class of errors to which distributed systems are especially prone due to their complex interactions and interdependencies between the services and the deployment environment. These interdependencies occur at all layers of the software stack, ranging from network services through middleware services to application components.

Large and complex infrastructure installations may be extremely difficult to efficiently manage since the subsystems may require individual configurations. Distributed environments such as large telecommunication networks, clusters of computing systems, data centers, industrial networks, grid systems, etc. may involve managing an extremely large number of subsystems such as service components and resources. The infrastructure can be immense and cluttered with a large number of configurations of machines and types of machines. However, manual configuration of the subcomponents and resources may be a difficult task requiring a significant amount of time and labor by system administrators. For example, the to be managed infrastructure may have a large number of sub-networks (e.g. fiber optic network, DSL network, etc.), modems, switches, intermediate nodes, devices, data centers, (virtual) machines, etc.

The work of operators to manage large distributed systems can be tedious and repetitive because similar operations and changes need to be carried out on multiple machines. Operators try to automate their work using ad-hoc scripts for example. Scripts automate certain aspect of the configuration and management of the machines and the software that runs on them (operating system, services and applications). Operator scripts are often custom for their environment, ad-hoc and very brittle because they evolved over many years without proper quality assurance process.

Typically, a desired end-service of interest which is to be provided to users using the available infrastructure may require a composition of multiple resources and service components which can together deliver the end-service. Such composition may often require careful configuration and deployment. The subsystems used for delivering a service are to interface with each other in an effective and compatible manner. A deployed service can be initialized for handing the workload submitted by users. However, it is also desired that the service can handle subsystem level faults adequately for providing a robust service while handling external events, user requests and/or fluctuations in the workload.

The provisioning of a requested service using an existing infrastructure can involve orchestration of a large number of heterogeneous subsystems, resources and/or service components. Manually managing the various machines and tasks can be tedious and also prone to human errors. Furthermore, the overall complexity of the managing can increase when resources belong to multiple administrative domains (e.g. different companies, different countries, etc.), often requiring input from multiple parties. For example, a communication path from a particular source to a particular destination may encounter networks of different parties (e.g. network operators, network providers, etc.). Setting up such a communication path in the infrastructure may require changing configuration on various distributed subsystems of the infrastructure. Once the subsystems are correctly configured, the communication can actually be established using the path.

A high level of complexity may also be faced when a new service is deployed on an existing infrastructure. Managing the lifecycle of the existing service may also be difficult. This can become even worse in a complex application environment; for example, an environment involving orchestration of a workflow formed by multiple application processes. Current system management technologies cannot handle such situations effectively.

Traditional automated orchestrators typically rely heavily upon knowledge of domain experts about the underlying infrastructure and subsystem requirements. Often the manual work involves time consuming configuring existing subsystems of the infrastructure and customizing the configuration and deployment steps for a new service so that the new service can be deployed successfully.

Often, an imperative approach is employed. In this approach, an imperative script can be used for configuring the subsystems of an infrastructure. However, with an imperative script, it may not be possible to assess the final state, making verification or an end result difficult. All possible conditions must be taken into account, which is not always possible in practice. Furthermore, the imperative script approach is sensitive to an initial state. Additionally, there is often a lack of traceability as there is not sufficient information about what is running and what the actual infrastructure looks like.

Configuration management tools offer a more structured approach to system administration automation. These tools exist in a broad range of automation and abstraction capabilities. At one end of the spectrum are tools that merely provide a framework to distribute, schedule and execute custom scripts and generate reports from the execution. On the other end of the spectrum are tools that offer a desired state orchestration model (e.g. configuration) of the managed infrastructure.

In desired state configuration management platforms, a central repository stores an input specification that describes the desired configuration of the managed distributed infrastructure/system. One or more translation agents generate the desired state of each of the resources the tool manages on various devices. A deployment agent on each managed device retrieves, through pull or push, the desired state of each of the resources it manages. The deployment agent then enforces the desired state of each of its managed resources. The existing desired state configuration management platforms cannot keep up with the increase in the speed of configuration changes and the increase in complexity of distributed applications, both trends which are largely driven by the increased importance of cloud computing and delivering software as a service.

There is a need for an orchestrator for deployment of a new service or for management of existing services on an infrastructure, which is more scalable, less prone to errors and/or more efficient, e.g. requiring less time-consuming manual operations. It is desired that the orchestrator can better lend itself to automation, requiring less administrator actions in the deployment workflow.

SUMMARY OF THE INVENTION

It is an object of the invention to provide for a system and a method that obviates at least one of the above mentioned drawbacks.

Additionally or alternatively, it is an object of the invention to provide for an improved desired state configuration management system and method.

Additionally or alternatively, it is an object of the invention to improve automation of a reconfiguration process in an infrastructure.

Additionally or alternatively, it is an object of the invention to reduce the need of manual (re)configuration of subsystems of an infrastructure, especially when a new service and/or a new feature is activated on the infrastructure.

Thereto, the invention provides for an orchestration system for configuring a large scale distributed infrastructure including multiple subsystems; wherein the orchestration system includes a declarative orchestration model for implementing desired states in the distributed infrastructure, wherein the orchestration model includes a plurality of pre-defined modules each implementing a desired state, wherein modules with higher-level desired states are communicatively connected to modules with lower-level desired states, and wherein at least one subset of the lower-level desired states provides deployable configuration parameters for subsystems of the infrastructure; wherein at least one module of the orchestration model is coupled to a multi-state finite state machine including a list of desired states, the finite state machine being configured to be in one selected desired state of the list of desired states at any time; wherein each finite state machine carries with it at least one set of service attributes, which serve as input to the orchestration model coupled to that finite state machine; and wherein the orchestration system is configured to monitor events, and to perform a dynamic state transition of at least one finite state machine from one desired state to another in response to one or more detected events triggering a transition condition.

The desired state declares the state in which services and/or subsystems (e.g. devices) of the infrastructure should be in, instead of employing imperative instructions. It can be less costly to learn, adopt, implement and maintain configuration through desired state configuration. The orchestration system allows for a rapid change of configurations of subsystems (e.g. devices, services, etc.) in the infrastructure, improving the controlling abilities. It provides also a resilience against threat of failure because at any time the deployment can be consistently repeated, rolled back, adapted, etc. to guarantee a desired end state. The complexity of managing the infrastructure can be effectively decreased and the infrastructure can be better controlled and/or adapted. For example, a continuous deployment can be provided by the orchestration system, providing the ability to deploy frequently, without the complexity of scripting. The orchestrator enables smooth and reliable operation of large-scale infrastructures, reducing time-to-value of new services provided using the infrastructure (e.g. cloud computing).

The orchestration system can provide repeatable deployment, configuration and conformance. It can be more effectively ensured that components of an infrastructure (e.g. data center) has the correct configuration, which avoids errors and prevents costly deployment failures. The orchestration system can be updated as a part of the service (e.g. application, data transmission service, cloud service, etc.), ensuring that the knowledge needed to deploy the service is up-to-date and ready to be used.

The multi-state desired state achieved by means of the finite state machines provides a large number of advantages. Since the finite state machines have a list of plurality of desired states, the orchestration system can respond to events (e.g. things that happen, the user requests a change, the monitoring system reports that a path is no longer available). The events may trigger a state transition in the finite state machine, so that the desired state of the module is transitioned to a different (new) desired state. As a result of this transition, a reconfiguration may be performed defined by the module. The orchestration system can be configured to attempt to go to the end state (desired state). This end state is fixed, which does not require a set of intermediate states for arriving at the desired end state. The finite state machine coupled to each module of the at least one module is always in exactly one state at any time. However, the desired state can be changed to one of the other desired states defined by the finite state machine, triggered by one or more events.

An event may for instance correspond to a request of a user to change a network/service configuration of a network infrastructure. In response to receiving the request, the orchestration system can determine one or more network configuration changes to make to effect the request to change the network configuration of the network. The infrastructure can be reconfigured by effecting the determined one or more network/service configuration changes.

The orchestration system according to the invention may provide a general-purpose orchestration platform for managing, configuring, and/or operating a large scale distributed (sub)systems in the infrastructure. The orchestration platform may provide a general configuration control and management tool. The orchestration model can be built based on the specifics of the infrastructure.

The orchestration system can perform configuration changes in the infrastructure based on the desired states of the modules. The orchestration system may configure and/or re-configure the subsystems of the infrastructure when a state transition of at least one of the finite state machines is triggered.

An integrated configuration management platform can effectively reduce the need for custom scripts. Such a framework approach provided by the orchestration system, can facilitate the development of custom scripts which integrate with the configuration model. The definition of the orchestration model can provide a stable interface for the scripts. The orchestration model can provide a high level description of a distributed infrastructure.

In the orchestration, the following terms can also be used. A 'service inventory' can be a database containing service instances. An 'entity type' can provide the specification of a desired state, the definition of a specific abstraction, to which refinements are coupled. A 'service type' can indicate a specific kind of service, formed by and entity type coupled to a specific lifecycle. A 'service instance' can be an instance of a service type, i.e. a unique identity, a version number, a set of current input parameters, a current life-cycle state, a set of prior input parameters and a set of candidate input parameters.

It will be appreciated that the module can be a service instance. In some examples, a module can be seen as an abstraction of a sub model of the orchestration model that is controlled by the finite state machine.

A service instance, given its current state, current input parameters and type is deterministically refined to low-level, deployable intents. Specific transition can manipulate the attribute sets. For example, when requesting an update, the user may upload a new set of values to the candidate input parameters. These candidate inputs can be validated. Once approved, they can be made effective by promotion: candidate becomes active, active becomes prior. For roll back, a transition can demote: active becomes candidate, prior becomes active.

Working with desired states can make it more difficult to respond to events that happen associated with the operations of the infrastructure. This is effectively solved by means of the invention using the multi-state desired state approach. The orchestration system provides a dynamic desired state approach (cf. multi-state) to provide a reliable network service using the infrastructure. In this way, changing conditions in the infrastructure can be adequately addressed. The finite state machines can suitably switch to a new desired state based on detected events.

Optionally, a transition of a current state of the finite state machine to a new state is reactive to an external event detected by the orchestration system, or an internal event including at least one of a completion or a failure to make effective at least parts of the current desired state.

The multi-state desired state orchestration system may define different operating modes as different states in state machines. The state machine may include different nodes each linked to a certain desired state. Conditionally, based on detected events, the state of the finite state machines can transition to a different desired state. Examples of events are when a different path is to be used for achieving a connection between two points; detection of a failure by a monitoring unit; a customer requesting a parameter update; etc.

The external events can be modeled in the state machines with transfers between different states. A desired state can correspond to an orchestration model, wherein the states in the finite state machine controls what desired state is selected.

For example, the higher-level desired state can remain the same (for example, connection between A and B), but the way it refines into independent steps by means of lower-level modules, can be changed by a state transition of the finite state machines of the module (or any lower-level modules) triggered by events (e.g. external events of outside world). For example, if path X is no longer possible for achieving the connection between A and B, then a same high-level objective can be interpreted as going through path Y. The change of path X to path Y may be implemented by a lower-level module triggered by the event that path X is no longer usable for example.

Advantageously, by employing the multi-state desired state approach, less manual maintenance may be required for keeping the infrastructure operational for providing a particular desired service.

Optionally, the orchestration system includes an event bus for communicating events. The event bus may for instance transmit events of the distributed devices, applications, services, and/or subsystems of the infrastructure to the orchestration system. Additionally or alternatively, also external events may be transmitted through the event bus to the orchestration system.

Optionally, the orchestration system includes one or more application programming interfaces (APIs), wherein the orchestration system is configured such that state-transitions of the finite element machine are triggered by one or more application programming interfaces (API) calls. Optionally, these calls are configured to manipulate one of the sets of attributes associated with the finite state machine.

The orchestration system can have event-driven desired states. A transition of the finite state machine from one state to a next state can be triggered by an API call. This can be represented by an edge of the finite state machine which defines which transitions are allowed and under which conditions. The edges of the finite state machine can accept certain triggers, e.g. API call, sequence of events, and/or explicit requests. The transitions can be executed based on various types of events or triggers. The event triggering the transition can for instance be resource based, for example if deployment of actual service comes into a particular state; when a particular service has been successfully created, etc. Furthermore, for example, if a lifecycle is changed externally, the desired state can also be changed (which is applied in the network resulting in a reconfiguration of one or more subsystems of the infrastructure).

The delivery of services can be better automated by means of the orchestration system. Also the evolution of a service throughout its lifecycle can be more efficiently automated.

The input of orchestration system may describe the desired state of the entire managed distributed system in a single orchestrator configuration model. This may be an integrated model allowing the orchestration system to derive the actions required to bring the actual state of the distributed system to the desired state. A plurality of machines, virtual machines, services, subsystems, etc. can be effectively managed in a distributed infrastructure with a corresponding integrated configuration model. It will be appreciated that the orchestration system may also manage heterogeneous devices: servers, network equipment, programmable infrastructure, etc. from a single integrated (orchestrator) configuration model.

The orchestration system may be configured to compare the desired state with the configuration on every managed subsystems (e.g. device, service, virtual machine, etc.) and derive a plan to move to the desired state (i.e. convergence). As the orchestration system supports convergence, divergences from the desired state can be automatically corrected.

Optionally, state transitions cause the sets of attributes to be manipulated in a pre-defined way.

Optionally, a network service is executed on the distributed infrastructure, wherein the network service is operable by means of detected events which are communicated to the orchestration system.

Optionally, different states of the list of states of the state machine represent different stages of a deployment lifecycle of a network service.

For example, for service delivery in telecommunication, different lifecycles may be defined. The finite state machine can effectively enforce/implement the condition of a service based on a selected lifecycle.

Optionally, the orchestration model includes information identifying the types of subsystems (e.g., network elements, routers, switches, etc., which may be standalone devices or may be included in a virtual environment), the capabilities of the subsystems (e.g., processor capabilities, memory capabilities, bandwidth capabilities, etc.), the geographic locations of the subsystems, or the like. Additionally, or alternatively, the orchestration model may include historical information associated with the subsystems with regard to providing the service (e.g., statistics, retransmission requests, forwarding rates, etc. associated with one or more network elements). The orchestration system may configure the subsystems to provide the service based on received information from the orchestration model, such that the service is provided in a more efficient manner (e.g., resources and/or functionality may be allocated to particular subsystems).

The orchestration system may be configured to monitor the subsystems and detect events. For example, the orchestration system may receive status information from one or more subsystems of the infrastructure that provide the service, and may detect an event that may warrant a modification of the service. For example, one or more subsystems may provide status information to the orchestration system indicating a resource utilization, a rate of received multicast traffic, a rate of retransmission requests (e.g., to other subsystems and/or from other subsystems and/or network elements and/or user devices), a quantity of dropped data packets, errors or faults, etc.

The orchestration system may monitor the status information and may detect an event, such as a failure, a utilization of a network path satisfying a threshold, a resource utilization of a particular subsystem satisfying a threshold, a quantity of packet loss satisfying a threshold, or the like. Based on detecting the event, the orchestration system may provide an instruction to modify a state of at least one of the finite state machines coupled to the modules of the orchestration model. The new desired state may be enforced in the infrastructure, for instance resulting in instructing a particular subsystem to change a configuration (e.g. increase a quantity of resources to be utilized to provide the service, to increase a cache size to support retransmission requests, to provide a different function in supporting the service, etc.).

Optionally, the finite state machine is configured to transition from a first state to a second state triggered by one or more events. In some examples, a condition for initiating a transition is the detection of a sequence of events.

Optionally, the finite state machines of the modules are each associated with a service instance.

Optionally, the finite state machine is configured to provide a rollback functionality, wherein in response to a rollback event, the finite state machine is configured to perform a rollback transition by moving to a next state in the finite state machine, wherein inputs to the module to which the state machine is coupled to are restored to stored inputs.

It should be appreciated that a previous desired state may not be the particular state in which the state machine was prior to transition, but instead it is the set of parameters that form the input to the module the state machine is coupled to. A rollback can be a normal transition, in response to an event, e.g. a failure to deploy, moving to a next state (in the state machine) (e.g. rollback-in-progress) while at the same time restoring the inputs to the module to the state that was stored.

Optionally, during a state transition of a particular finite state machine from a previous desired state to a new desired state, the previous desired state is stored, wherein the orchestration system is configured to automatically roll back to the previous desired state of the particular finite state machine if a rollback condition is met.

For example, the high-level desired state may define to upgrade the network bandwidth of a certain service. The change can be made and verified by the orchestration system. The change can be rolled out in the network. Configuration changes can be pushed on various elements, for example. However, if there is a failure when applying configuration changes to one of the elements (for example, certain constraint that is physically present in the machines which not modeled in the orchestration model, causing it to fail), a roll back can be carried out in the state machine (triggered by condition of failure), which returns the configuration changes to the previous state. In this way, the network bandwidth can be returned to the previous bandwidth for example. As a result, the subsystems can be re-examined, and the subsystems where the change was successful can be put back to the previous configuration. By means of the finite state machines, this process can be done fully automatically, so there is no need to manually verify on the machines whether it is set to the upgraded network bandwidth. Advantageously, the successful adjustment or unsuccessful adjustment can be used as an event to transition the finite state machine to another state.

Optionally, the rollback condition is met when at least one step in a transition campaign carried out on the orchestration model fails.

Optionally, the orchestration system keeps track of three versions of configurations and/or parameters of the subsystems of the infrastructure, namely a preceding old version, a current version, and a next version. For example, if a parameter is changed, the next set of parameters is determined and the orchestration system can validate and update the version. The orchestration system can check whether the new set of parameters is acceptable for roll out, e.g. check whether all limitations in the orchestration model are permissible. If the change is not acceptable, a roll back can be performed.

Optionally, the orchestration system is configured to perform a validity check when a transition is initiated, wherein the finite state machine is configured to check whether the transition to the desired state is allowable.

Optionally, the orchestration system is configured to generate configuration artifacts from a complete and refined configuration model. The orchestration system may deploy changes required to change the state of the managed resources to the desired state described in the configuration model.

Optionally, the modules are arranged in successive layers for refining high-level desired states into lower-level desired states, wherein a desired state of a module in a higher layer is refined into one or more desired states of modules in a successive lower level, the modules in the higher layer having a higher-level desired state than the modules in the successive lower layer, and wherein at least one subset of the lower-level desired states provides the deployable configuration parameters for services and/or subsystems of the infrastructure. Optionally, the refinement is conditional to the current state and attribute sets of any of the associated state machines.

The modules may be represented in different layers of implementation. Some lower-level desired states may result in setting of configuration parameters of subsystems of the infrastructure (e.g. devices, virtual machines, etc.). The refinement process can be performed by means of the finite state machine. For example, lifecycles of a service can be modelled by means of the finite state machines employed in the orchestration system.

The orchestration system can be configured to fully automate the allocation of configuration parameters for specific services or subsystems, possibly based on monitoring information to close the control loop. The orchestration system can enforce configuration changes in a declarative way, wherein high-level configuration concepts are refined to deployable configurations using higher-level and lower-level modules in the orchestration model.

Optionally, the orchestration system is configured to provide an integrated configuration generation, wherein implementation-level configuration artifacts are generated (such as configuration files, network switch definitions, service state, etc.) from a higher-level configuration. The orchestration system may deploy configurations and manage the orchestration of configuration changes in a gradual, controlled and robust way.

Optionally, the orchestration model is reconfigurable.

Optionally, the orchestration model is a modular and reusable configuration model. For instance, changes in the infrastructure can be easily implemented in the orchestration model.

The orchestration system can be configured to manage the deployment process, keeping track of all current states of the modules and implementing their configuration. The orchestration system may store its state in a database. The source code of the orchestration model may be compiled by a compiler into deployable resources. The deployable resources can be exported to a machine (e.g. virtual machine) on which the orchestration system is operating. This machine may be controlled via a general user interface (e.g. web dashboard) or a command line tool. Communication with the machine can be performed by means of API calls.

Optionally, modules of the orchestration model are reconfigurable, wherein at least the list of states and the conditions for state transitions defined by the finite state machines coupled to the modules of the orchestration model are adjustable.

The configuration model can express a configuration at a high level of abstraction, and refine that model to the level of abstraction at which the configuration is enforced on real world infrastructures. In this way, the configuration of a distributed infrastructure and its execution environment can be managed end to end. The user may change the orchestration model. The modules and their arrangement can be adapted in the orchestration model. Furthermore, optionally, the orchestration system may allow the user to select a specific path or select specific subsystems for certain services.

The orchestration model may be an integrated model with multiple levels of abstraction. The modeling of relations between configuration parameters in the orchestration model can reduce configuration parameter duplication. Additionally or alternatively, plug-ins can allow the inclusion of computation routines developed in general purpose programming language.

Optionally, the orchestration system is adapted to manage at least one of: a large-scale telecommunications infrastructure, a cloud infrastructure, a web-service infrastructure, or a database infrastructure.

The infrastructure may for instance have wired and/or wireless network architectures, or a combination of wired and wireless network architectures. For example, in telecommunication, management and configuration of an infrastructure is challenging as there are many different types of machines spread throughout the infrastructure communicatively coupled with each other, which usually require a large number of different types of configurations. Often, it takes a large amount of time for releasing new features and/or services using an existing infrastructure. This is mainly because a lot of manual work has to be done for suitably configuring the infrastructure. This can be effectively handled by the orchestration system according to the invention. The desired state can better verify and it can be determined whether an infrastructure is compliant with the desired operational conditions for providing a service.

The orchestration system can be used for maintenance, administration or management of at least one of a infrastructure or a network. An automatic configuration management or configuration setting of infrastructures, networks and/or network elements can be provided. The orchestration system may include communication protocols supporting networked applications involving the movement of software or networked applications configuration parameters.

The infrastructure may provide for distributed computing services, and any other type of resource-on-demand services. The orchestration system can better manage the resource-on-demand services, including provisioning resources to satisfy user demands.

The orchestration system can be configured to provide an intent-based service orchestration. The orchestration system can receive, over a network, a request from a customer for network services on an infrastructure.

The configurations of the subsystems of the infrastructure can be designed such that reading, storing, and updating by means of the orchestration system is allowed.

Optionally, the orchestration system is configured to: receive information associated with a service to be provided using the infrastructure; receive information associated with a plurality of subsystems of the infrastructure (e.g. network devices) providing the service; configure the plurality of subsystems of the infrastructure to provide the service; monitor external events relevant for the service; detect a transition triggering event based the monitored external events; and provide an instruction, to perform one or more state transitions of one or more finite state machines to new desired states based on detecting the transition triggering event, wherein the new desired states are enforced in the infrastructure, resulting in modifying subsystem configurations.

Optionally, the orchestration system includes a generation unit which enables stepwise refinement of high-level configuration descriptions and automated generation of configuration artifacts.

Optionally, the orchestration system includes an enforcement unit which gradually deploys the generated configuration artifacts onto the managed distributed system or infrastructure.

The orchestration system can be configured to adapt the initial configuration model to a complete configuration model which contains the desired state of all resources in the distributed system that the orchestration system manages.

The enforcement unit can be configured to enforce the generated desired state upon the distributed system and its execution environment. The enforcement unit can manage the state of the resources in the distributed system that are represented in the completed configuration model. Enforcing the desired state can be either performed by the orchestration system, deployment agents Optionally, the deployment agent is configured to repair and/or change the infrastructure at regular intervals. Optionally, the agent is configured to enforce a desired state when the orchestration system requests it. At regular intervals the agent can verify that the current state of all resources it manages matches the desired state provided by the orchestration system.

The deployment agents can be configured to compare the desired state in the model, with the current state of the managed resources. From this comparison the actions to advance the current state to the desired state can be derived. The deployment agent can apply the concept of convergence to ensure that failures during actions or missing runtime dependencies are resolved during the deployment process. This process can also automatically detect and revert external changes due to bugs, manual changes, etc.

The deployment agent can be a component of the enforcement unit that actually enforces configuration changes. It will be appreciated that also external agents may be used. In some examples, also external enforcement units can be used.

Optionally, the orchestration system can interactively implement changes to the infrastructure, wherein user-provided changes are pushed to the agent. The orchestration system can be configured to push full and incremental desired state to the agent. For example, a completion or failure of (parts of) a deployment by the agent can also trigger a transition (e.g. from a 'deploying' state to an 'up' state)

It will be appreciated that the events can be received by the orchestration system over a network. In some examples, an event is a request for a network service, the request for network service including for instance desired performance parameters. In some examples the request is without information regarding any of specific hardware, specific hardware type, specific location, or specific network location for providing the requested network service. The allocation and configuration of network resources for provisioning the network service can be managed and operated by the orchestration system.

Optionally, at least a top module of the orchestration model is coupled to a finite state machine. In an example, only the top module is coupled to a finite state machine. In some other examples, modules in intermediate layers and/or lower layers may also include state machines coupled thereto.

According to an aspect, the invention provides for a method for configuring a large scale distributed infrastructure including multiple subsystems, the method including the steps of: providing an orchestration system including a declarative orchestration model for implementing desired states in the distributed infrastructure, wherein the orchestration model is provided with a plurality of pre-defined modules each implementing a desired state, wherein modules with higher-level desired states are communicatively connected to modules with lower-level desired states, and wherein at least one subset of the lower-level desired states provides deployable configuration parameters for subsystems of the infrastructure; coupling at least one modules of the orchestration model to a multi-state finite state machine including a list of desired states, the finite state machine being configured to be in one selected desired state of the list of desired states at any time, wherein each finite state machine carries with it at least one set of service attributes, which serve as input to the orchestration model coupled to that finite state machine; and monitoring events by means of the orchestration system, and performing a dynamic state transition of at least one finite state machine from one desired state to another in response to one or more detected events triggering a transition condition.

The monitoring of events can also be carried out by an external system for example communicatively coupled to the orchestration system. The orchestration system may be configured to receive the monitored events.

A roll out of a new service and/or feature of the infrastructure can be better handled. The infrastructure can be more efficiently set up and/or configured. The automatic configuration of the infrastructure can be improved for allowing desired communication and/or services on the infrastructure.

The orchestrator may initially configure the subsystems to provide the service using the infrastructure, and may re-configure one or more subsystems based on monitoring the network and/or external events, wherein the re-configuration is achieved by adjusting a desired state of at least one finite state machine coupled to a module of the orchestration model.

The orchestrating method or system may conserve the network, memory, and/or processor resources of the infrastructure by dynamically allocating resources to a particular subsystem of the infrastructure that may support the service, wherein the dynamic allocation is achieved by means of multi-state desired states of modules with finite state machines having a list of desired states.

Additionally or alternatively, the orchestration method or system can allow dynamic modification of the service based on external events and/or based on monitoring the subsystems of the infrastructure providing the service.

Optionally, responsively to events an instruction is generated to initiate one or more state transitions in one or more finite state machines coupled to the modules of the orchestration model, wherein the state transitions result in implementation of one or more configuration changes in the subsystems of the infrastructure. For example, an API call can initialize a state transition.

Advantageously, a configuration refinement process defined in the orchestration model can be linked to a plurality of state machines coupled to at least a subset of the modules of the orchestration model. In this way, the refinement process defined in the orchestration model can be made dynamic. The subsystems of the infrastructure can be configured differently when the finite state machine is in a different state.

The orchestration model may include a refinement in which high-level objective is broken off into a plurality of intermediate objectives, and further to definitive objectives (cf. actual configuration changes). It will be appreciated that this refinement can be designed in different ways.

According to an aspect, the invention provides for a computer program product configured for performing, when run on a controller, the steps of the method according to the invention.

According to an aspect, the invention provides for a device for configuring a large-scale distributed infrastructure including multiple subsystems, the device comprising a computing unit including a processor coupled to a memory operable to cause the computing unit to carry out the method according to the invention.

According to an aspect, the invention provides for a computer software for implementing network services orchestration, and in particular to computer software for implementing desired state/intent-based network services orchestration. A multi-state orchestration can be employed wherein the transition of an actual/current desired state to another new desired state is event-based.

According to an aspect, the invention provides for a software and systems management in infrastructures, such as networked computer environments and/or telecommunications networks.

According to an aspect, the invention relates to a non-transitory machine-readable medium comprising instructions that, when executed, cause a machine to perform the method according to the invention.

According to an aspect, the invention provides for a computing system, comprising: at least one processor; and at least one non-transitory computer readable medium communicatively coupled to the at least one processor, the at least one non-transitory computer readable medium having stored thereon computer software comprising a set of instructions that, when executed by the at least one processor, causes the computing system to perform the method according to the invention.

According to an aspect, the invention provides for an orchestration model as described above.

Advantageously, the orchestration system provides for an improved control over the virtualization of the infrastructure such that a part of the telecom service can more easily be implemented in the cloud.

Some of the subsystems of the infrastructure may be virtual machines. The virtual machine (VM) can be a software implementation of a machine (i.e. a computer) that executes programs like a physical computer. Software running inside a virtual machine may be limited to the resources and abstractions provided by the virtual machine. Virtualization may allow the sharing of the underlying physical resource between different virtual machines. For example, by means of virtual machines, multiple operating system (OS) environments, each a VM, can co-exist on the same physical host machine.

The virtual machines may for instance be used in data centers including facilities to house computer systems and associated components, such as telecommunications and storage systems. Virtual machines may be used in data centers to help manage the use of the data center hardware. For example, instead of dedicating each data center server to a single physical host device, the data center servers may be implemented as virtual machines in which multiple virtual machines are run on a single physical host device. As the computing demands of the data center changes, virtual machines can be dynamically added, removed, or moved between physical hosts.

It will be appreciated that a unit of configuration specification can be decomposed in a set of parameters (e.g. configuration parameters for mail servers, DNS clients, firewalls, web servers, etc.). A web server, for example, has parameters for expressing its port, virtual hosts and supported scripting languages. The orchestration system can generate and enforce the parameters needed for achieving the desired state of the modules.

According to an aspect, the invention provides for an infrastructure, wherein the infrastructure is formed by a telecommunications network for data traffic, the network comprising a plurality of subsystems (e.g. devices) coupled to one another, wherein the subsystems are configured by means of the orchestration system according to the invention.

The infrastructure may include a plurality of servers hosting virtual machines, switches for coupling the plurality of servers to an external network, virtual machine control units configured to provision and manage the virtual machines, a network control unit for managing the plurality of servers and switches. Based on the desired states of the modules of the orchestration model, a need for changing to the virtual machines, servers and/or the plurality of switches can be determined and enforced. A virtual machine may for instance host a virtual web server, a database server, and/or an email server.

According to an aspect, the invention provides for a configurable infrastructure subsystem (e.g. device) for use in an infrastructure, the subsystem being adapted and configured to be coupled to a central orchestration system according to the invention, wherein the subsystem is configured to be operable by the orchestration system.

According to an aspect, the invention provides for a desired-state orchestration system for configuring a large scale distributed infrastructure including multiple services and/or subsystems; wherein the orchestration system includes an orchestration model for implementing a high-level desired state in the distributed infrastructure, wherein the orchestration model includes a plurality of pre-defined modules and is configured to refine the high-level desired state at a first module into a plurality of lower-level desired states at second modules, wherein at least one subset of the lower-level desired states at the second modules provides deployable configuration parameters for services and/or subsystems of the infrastructure; wherein some modules of the orchestration model are coupled to a multi-state finite state machine including a plurality of nodes and edges, wherein each node of the finite state machine is associated with a particular state, and wherein each edge of the finite state machine represents a conditional state transition; and wherein the orchestration system is configured to monitor events and perform dynamic state transitions of the finite state machines responsive to one or more detected events. Optionally, each edge is coupled to a service instance.

An application programming interface (API) may be provided allowing for the user to design, configure, modify the orchestration model without using the graphical user interface (GUI). In some examples, any action that can be taken using the GUI can be executed using the API, but the API optionally allows for additional user-generated logic. Further, in some examples, an API client may be provided allowing the user to interact with the API. Additionally or alternatively, the user can interact with the API by means of a programming language, such as for example Python. Additionally or alternatively, the user can interact with the API via the terminal of their computer by using a command line program. It will be appreciated that API commands can be chained together to form an API script. In this way, the automation and integration of various service features can be enabled. The API may offer various advantages over the GUI via programmatic access and automation, allowing for the creation of complex processes and workflows that would be not be practicable or cost efficient to implement as a GUI feature. The API may be used for generating events.

Though the API has many advantages over other modes of interaction, it may lack several benefits conferred using the GUI. For example, The API may not be accessible to users having insufficient programming expertise. In some cases, the API includes features not present in the GUI, those interacting with the service only with its GUI are unable to take advantage of the advanced features. In some advantageous examples, the user can use a combination of a GUI and a programming language for interacting with the orchestration model for the infrastructure.

Optionally, the orchestration system includes a data collector unit configured for collecting event data.

In some examples, a desired performance parameter for a network service is defined. The orchestration system can allocate one or more network resources of the infrastructure for providing the requested network services, using the orchestration model, e.g. based at least in part on the desired performance parameters and a determination that the infrastructure is capable of providing network resources each having the desired performance parameters. The orchestration system may be configured to determine whether the infrastructure can no longer provide a desired performance parameter at the current state of the infrastructure, for example based on at least one network performance metric. The orchestration system can be configured to allocate alternative network resources of the infrastructure, based on a determination that at the current state the infrastructure can no longer provide a desired performance parameter. This can be performed by means of the finite state machines which can be configured to adapt network resources conditionally, i.e. transfer from one state to another when such network performance metrics are detected as events. The changes of the desired states in the modules can result in a configuration of the subsystems of the infrastructure for obtaining provisioning of the requested network services having the desired performance parameters. In some examples, the desired performance parameters may include at least one of a maximum latency, a maximum jitter, or a maximum packet loss.

The performance metrics can monitor in a real-time manner, a periodic manner, a per-request manner, a programmed manner, or a random manner.

In some examples, during reconfiguration, the orchestration system may input generated commands to one or more subsystems of the infrastructure through a remote session established with one or more physical switches. The one or more commands may for instance be generated by completing fields of a pre-generated template.

The finite state machine of the module may change the desired state at least partially based on quality of service policy configurations, security policy configurations, user requests, internal or external events, etc. The required changes linked to the desired state can be implemented by means of agents for example. These elements can be communicated to the orchestration system by means of events. The orchestration system may be arranged to listen at an event bus.

In some examples, the orchestration system may be configured to maintain a traffic service level for data communicated from a source to a destination through a path of the infrastructure. The orchestration system may be configured to monitor the traffic service level associated with the path between the source and the destination, and determine whether the traffic service level associated with the path meets one or more performance metrics. A service level violation can be indicated when a flow of data communicated over the monitored path between the source and the destination fails at least one of the performance metrics. An alternate path can be selected from other of a plurality of paths between the source and the destination, wherein the alternate path provides for a traffic service level that resolves the service level violation from the source to the destination. The alternative path can be defined by desired states of the finite state machines of some modules of the orchestration system.

Optionally, selecting the alternate path further comprises: monitoring the traffic service level associated with the other of the plurality of paths between the source and the destination; determining a subset of alternative paths that meet the one or more performance metrics, where the subset of alternative paths are configured to transport data between the source and the destination; switching the state of the finite state machine to a new desired state choosing an optimized path between the source and the destination, for example using a set of statistical data from the subset of alternative paths, wherein the new desired state applies the optimized path, wherein the optimized path resolves service level violations associated with the path from the destination to the source.

Optionally, the flow of data is routed from the monitored path, that fails at least one of the performance metrics, to the alternate path. For example, routing the flow of data may include changing one or more source addresses in a routing table to include the optimized path from the destination to the source. This may for instance be achieved by lower-level modules of the orchestration model.

Although the embodiments of the invention may comprise computer apparatus and processes performed in a computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

It will be appreciated that any of the aspects, features and options described in view of the system apply equally to the method and the described device and computer program product. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
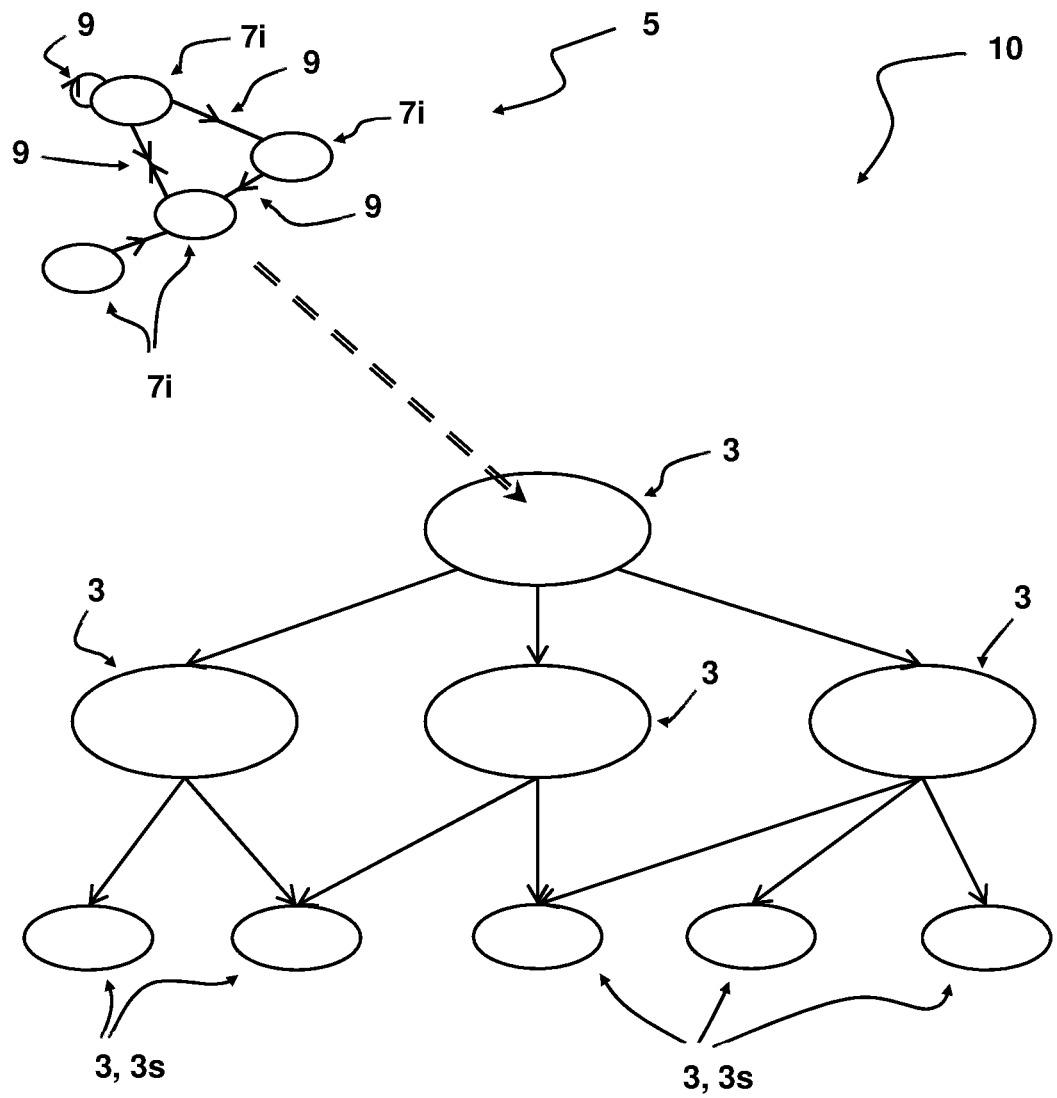
FIG. 1 shows a schematic diagram of an embodiment of an orchestration model.

FIG. 1 shows a schematic diagram of an embodiment of an orchestration model 10 of an orchestration system for configuring a large-scale distributed infrastructure including multiple subsystems. The orchestration model is declarative for implementing desired states in the subsystems of the distributed infrastructure. The orchestrator mode 10 includes a plurality of pre-defined modules 3 each implementing a desired state. The modules with higher-level desired states are communicatively connected to modules with lower-level desired states. At least one subset 3s of the lower-level desired states provides deployable configuration parameters for subsystems of the infrastructure. At least one module 3 of the orchestration model 10 is coupled to a multi-state finite state machine 5 including a list of desired states. In this exemplary representation, the list is shown as nodes 7i. Each of the nodes 7i represents a desired state. The nodes 7i are connected to other nodes representing different desired states. The finite state machine 5 is configured to be in one selected desired state of the list of desired states at any time. The orchestration system is configured to monitor events, and to perform a dynamic state transition of at least one finite state machine 5 from one desired state to another in response to one or more detected events triggering a transition condition. The possible transitions are represented as edges 9.

In the orchestration model 10, a high-level configuration description of an application can be refined to the configuration of a functional application, equipped with all the necessary configuration details for a target environment. For instance, based on the orchestration model 10, the orchestration system can generate configuration artifacts by refining high-level and partial configurations iteratively in function of lower level configurations. Thus, enabling users of orchestration system to express the configuration of all managed resources in a single integrated configuration model (i.e. orchestration model 10). By means of the integrated configuration model it can be determined what is deployed on the infrastructure and how it is configured. This means that there can be a single point of access to the configuration of the infrastructure. This can make access control and audit easier.

With a very large and/or complex infrastructure, small failures (e.g. subsystems that temporarily fail to operate) occur relatively often. A specific step-by-step plan (imperative) is much more sensitive to errors. Sometimes an network operator input is required when a failure has occurred. The orchestration system is better capable of handling an intermittent failure (cf. a failure that passes). The orchestration system can continue automatically without requiring further input from a network operator. Advantageously, the orchestration system can have self-healing capabilities.

A high-level desired state can be something a customer can order for instance, for example a communication link between two physical locations. Such a connection can include a plurality of intermediate steps which are automatically broken down into a plurality of other sub-steps. Each of the steps may, for example, require a large number of parameters to be configured. The steps can in turn be subdivided into individual configuration elements (e.g. artifacts, files, etc.), which are then automatically pushed to the devices. This can make the communication link effective. The refinement process can also ensure that the configuration can be automatically changed when a path providing the communication link through the infrastructure is changed.

In some examples, a lowest level module can be configured to perform concrete actions, such as reconfigurations, parameter adjustments, etc., carried out concretely on a device or virtual machine. For example, the orchestration system may implement a desired state by placing a file on a certain server with certain specific content and/or certain user permissions. The actual state can be compared to a desired state. The orchestrator can check/verify whether a desired state is implemented, but can also define the actions that need to be performed in order to arrive at the desired state. For example, the orchestrator can check whether a port is activated. If that is not the case (i.e. port deactivated), the port can be activated, corresponding to the desired state. If the port is already activated, then no action is required since the desired state is already the actual state. This provides important advantages over an imperative orchestration system.

It will be appreciated that the infrastructure may have various forms and arrangements. In some examples, the infrastructure includes one or more networks. The infrastructure may for instance have a set of networks connected with each other.

Figure 2:
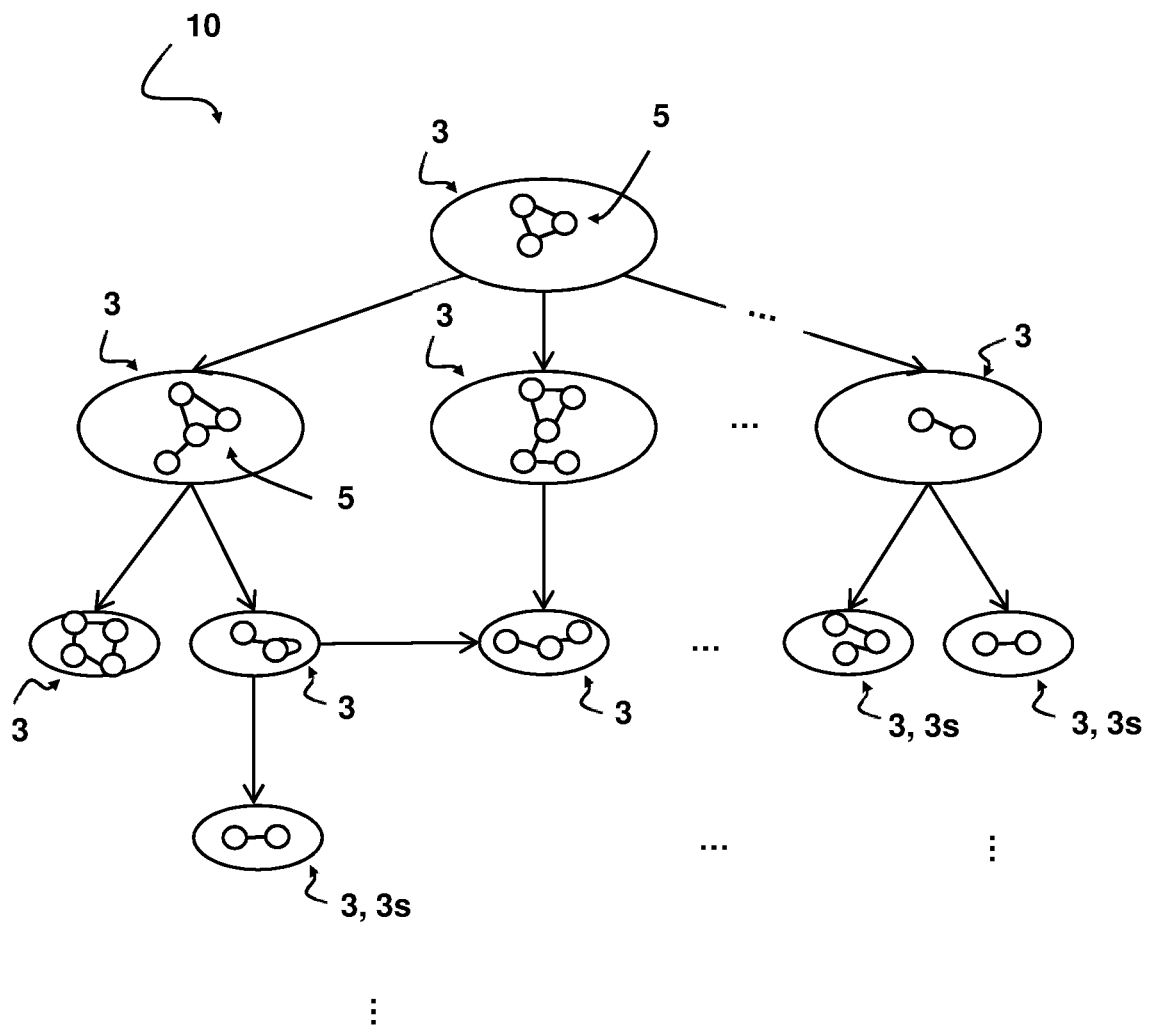
FIG. 2 shows a schematic diagram of an embodiment of an orchestration model.

FIG. 2 shows a schematic diagram of an embodiment of an orchestration model 10. The orchestration system may provide an integrated orchestration management for infrastructures e.g. hosting application services and/or other virtualized environments. In some examples, the orchestration management provides configuration management. It will be appreciated that the infrastructure may be entirely virtual in some examples. The orchestration model 10 may include a plurality of entities and abstraction levels. It can be tested, versioned, evolved, adapted and reused by means of the orchestration system.

The orchestration model 10 can be configured to provide a configuration model describing relationships between and dependencies to other services, packages, devices, underpinning platforms and infrastructure services. In this way an efficient deployment can be provided. An end-to-end compliance can be implemented by the orchestration system. The orchestration system can be configured to guarantee consistency across the entire stack and throughout distributed systems at any time. For example, the architecture of a software service can drive the configuration.

The orchestration system can be configured to manage complex infrastructures, for example in a cloud environment. The orchestration system may be configured to be run on a machine or server (e.g. configuration management server). Optionally, a user can operate the orchestration system using a dashboard (e.g. general user interface) and/or a command line interface.

The modules 3 may contain configuration information, based on the currently selected desired state of the finite state machine 5. The configuration information may include parameters and/or instructions, or information which is provided to one or more other modules (e.g. successive module).

The configuration which is deployed by means of the orchestration system can depend on the current states of the finite state machines 5 coupled to the modules 3. At least one module 3 will be in a particular selected desired state from a list of possible desired states defined by the finite state machine 5. The transition of the current desired state to another desired state can be conditional and defined by the finite state machine 5.

The orchestration model 10 may be a declarative model (i.e. not imperative) for configuring the infrastructure. The infrastructure may for instance be a very large infrastructure or infrastructure that is slow/difficult to manage (e.g. network devices with underpowered control planes or thousands of managed resources). The modules 3 can have a number of attributes and relations to other modules 3. A relation can be a unidirectional or bidirectional relation between modules 3. The modules 3 may define what should be deployed. The modules 3 can be either deployed directly (e.g. files, packages, implement configuration parameters, etc.) or they can be refined (cf. coupled to other lower-level modules). Refinement can expand an abstract module 3 into one or more concrete modules 3. At a lowest level of abstraction, the configuration of an infrastructure may consist of configuration files. To construct configuration files, templates, etc. can be used.

In some examples, the orchestration system includes handlers which are configured to change the current state of a resource in the infrastructure to a desired state expressed in the orchestration model 10.

Optionally, the orchestration system includes one or more agents configured to execute configuration changes on targets (cf. subsystems of the infrastructure). A target or subsystem can for instance be a server, a network switch, a cloud service, an API, etc. The one or more agents of the orchestration system may be configured to perform all changes in the infrastructure. Optionally, the one or more agents of the orchestration system can be arranged to manage local and remote resources. In some examples, the orchestration system starts one or more agents. It is also possible that the agent is deployed as a separate process. Various communication protocols may be used when an agent needs to make a configuration change on a machine and/or virtual machine. For example, the agent can make the changes over a remote ssh. In some examples, an external agent connects to the orchestration system and is provided with explicit configurations to be implemented on machines and/or virtual machines of the infrastructure.

It will be appreciated that the arrangement of the modules 3, their connections, and the finite state machines 5, in the shown orchestration model 10 is merely provided as an example. Various other arrangements and configurations are envisaged.

Figure 3:
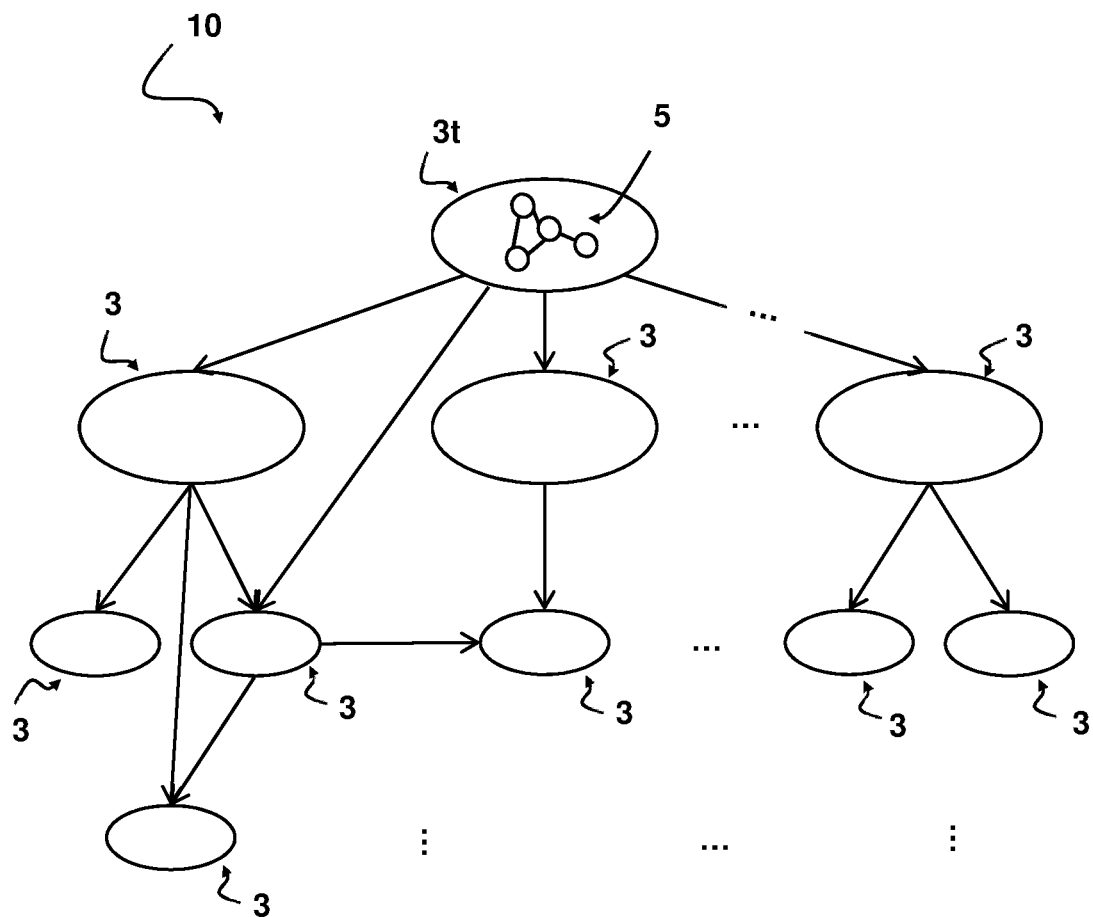
FIG. 3 shows a schematic diagram of an embodiment of an orchestration model.

FIG. 3 shows a schematic diagram of an embodiment of an orchestration model 10. In this example, only a top module 3t of the orchestration model 10 is coupled to a state machine 5. However, in some examples, also other modules 3 may be coupled to a finite state machine.

Not every module 3 necessarily has a state machine 5 coupled thereto. In some examples, at least one group of modules 3 is not coupled to a finite state machine. This group of modules may be driven by one or more state machines coupled to other modules in connection therewith via a path in the orchestration model 10 (e.g., higher-level state machines, or in higher layers). These paths can be followed by arrows in the figure. In this shown example, each other module has a path to the top module 3t coupled to a finite state machine.

Figure 4:
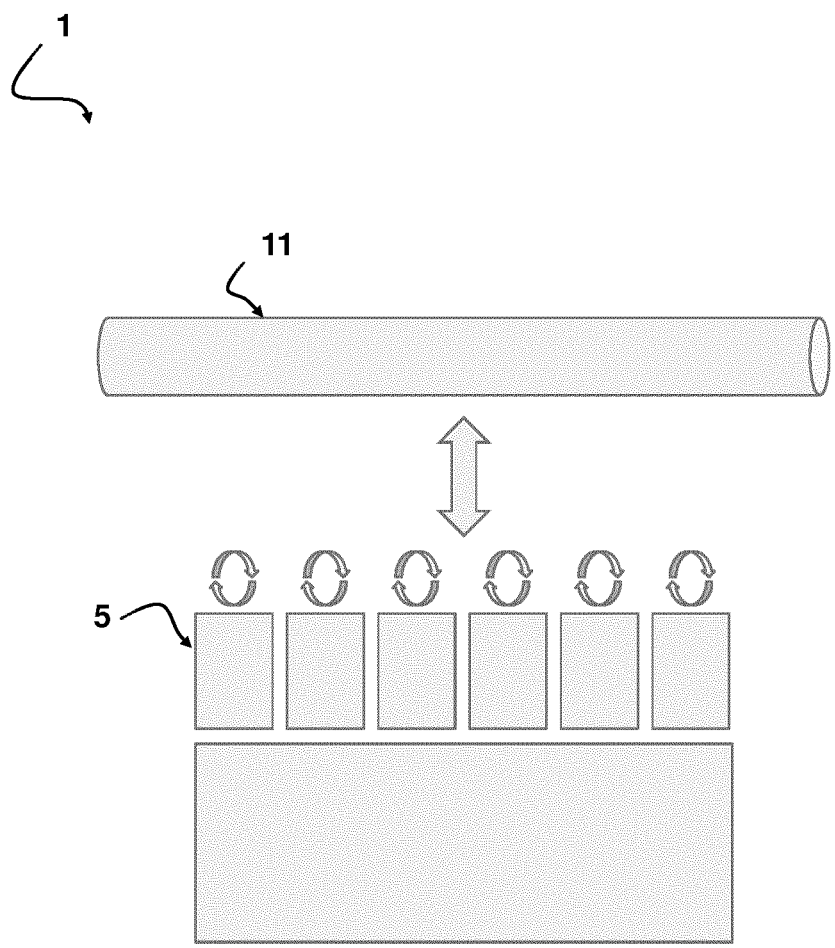
FIG. 4 shows a schematic diagram of an embodiment of an orchestration system.

FIG. 4 shows a schematic diagram of an embodiment of an orchestration system 1. The orchestration system 1 includes an event bus 11. State machines 5 are used as an intermediary between desired states and events provided by means of the event bus 11. In this way, the event-response can be stabilized. Moreover, the desired states can be made responsive to events. In this way, any kind of process can be described.

Many existing technologies require a step-by-step listing of actions to be taken (cf. script) for reconfiguring infrastructure subsystems. The orchestration system 1 enables defining the desired end state when the reconfiguration is completed. This goal orientated approach can ensure that the desired state in the network is enforced.

The orchestration system 1 can be agnostic, such that it can be used for various different infrastructures. For example, the infrastructure may be configured for providing software components on a cloud (e.g. Google, Amazon, Dropbox, etc.). It is also possible that the infrastructure is arranged to provide a firewall service. It is envisaged that the orchestration system can be used for managing various types of infrastructures. For example, the infrastructure may be an internet network, a PLC network in a factory, a fiber network, a DSL network, etc., or a combination thereof. Other examples are also possible.

The orchestration model 10, e.g. for a specific service, can have different layers of modules with different levels of desired state. A high-level desired state may be a goal not requiring a direct reconfiguration of one of the subsystems of the infrastructure. An example of a high-level desired state is 'connection between A and B'. The desired state may for instance require that the connection line between A and B is established. The orchestration model may have a number of lower-level layers with modules having lower level desired states. Some of the lower-level desired states may result in actual reconfiguration of subsystems (e.g. adjustment of a parameter on a particular switch or router on a particular port). In this refinement process, higher-level desired states are refined into lower-level desired states resulting in actual reconfiguration of subsystems of the infrastructure.

The orchestration system 1 enables faster and more efficient delivery of applications and services to customers (e.g. cloud computing) through the infrastructure. Additionally or alternatively, the orchestration system 1 can be used for managing telecommunications infrastructures, wherein the end-to-end operational process of the infrastructure is automated by means of intent-based service orchestration.

The orchestration system 1 enables verifying whether the configurations of the infrastructure are as desired, since the desired state is known and defined. This enables setting up the system and also restoration of the system in case of problems (cf. self-healing), resulting in a stable and robust orchestration system.

The state machines can be event-driven, reactive to detected relevant events. If an event occurs, a transition to another state of the finite state machine can be triggered.

The complexity of an orchestration model can be hidden through intermediate layers. This makes it possible to design with aspects that are more meaningful to a designer (for example, geographically useful). At the lower-layers (cf. lower-level modules), it can be determined how an abstract entity is actually implemented in the infrastructure.

For example, when a telecom service is designed by a network architect, it is determined which high-level service is offered to the customers. A network diagram can be defined in the orchestrator so that everything can be systematically tracked. The orchestration model can convert changes that occur in high-level input parameters into what needs to happen in concrete terms, rather than having an operator to perform this task. As a result, the orchestration system can better deal with failures occurring in the infrastructure.

According to an example, the infrastructure relates to a cloud webshop platform including a database, a frontend portion and a backend portion. The webshop platform may be arranged to keep track of an inventory and provide a website which customers can visit. A large number of different separate servers may be arranged together forming the database, frontend and backend portion. These servers may be represented by modules in the graph of the orchestration model. The servers may be distributed. Furthermore, different types of servers may be used (for example different vendors and equipment type). For example, a set of parameters may relate to the load. Objectives may also relate to security (for example protection against distributed denial of service attacks). Various other objectives/parameters can be defined. For example, it can be defined that a certain number of copies of the database service should be stored at any time. If for instance a virtual machine containing the database is lost, the orchestration system can be configured to automatically start a new virtual machine on which a copy of the database is stored. If the new virtual machine is active, the database can be copied thereto and the machine can be connected to the infrastructure.

For every service instance (e.g. network security service, communication line between two points, etc.), a lifecycle may be defined. The finite state machine may include the different lifecycles stages as different states in the list of finite states. For example, each of the nodes in the finite state machine may represent one of the states in which the service can be. And the edges of the finite state machine may indicate what the valid transitions are (for example when a service is in "creating" lifecycle state, it should not go to "updating" lifecycle state). All the lifecycles and the constraints related thereto can be easily modeled on the basis of the finite state machines coupled to the modules of the orchestration system.

The events detected by the orchestration system can be linked to desired states by means of the finite state machines 5. The orchestration system can become more robust as a reaction to particular events (e.g. errors) can be taken into account, and the reaction to it can be stabilized. The desired states of the modules of the orchestration system can be made dynamic and responsive, providing traceability, error recovery functionalities, etc. The orchestration system can be configured to systematically (e.g. periodically) verify whether the desired states in which the finite state machines are set are being implemented and/or enforced.

The orchestration model 10 can be built depending on what service is to be provided using the infrastructure. This can be defined in high level, by describing what is offered to the customers for instance. The one or more high level modules in the orchestration model can be connected to lower level modules (refinement om the high-level objectives) which model the desired states in more concrete terms. For example, in the lowest level modules certain configuration adjustments may be performed, e.g. reconfiguring a physical switch in a network, starting a machine in a datacenter, adjusting parameters in a virtual machine, etc. The orchestration model 10 can then be implemented on the infrastructure using the orchestration system. The modules 3 of the orchestration model 10 have dynamic desired states achieved by the finite state machines 5 which can transition from a current state to another desired state, conditionally based on events (e.g. external).

Figure 5:
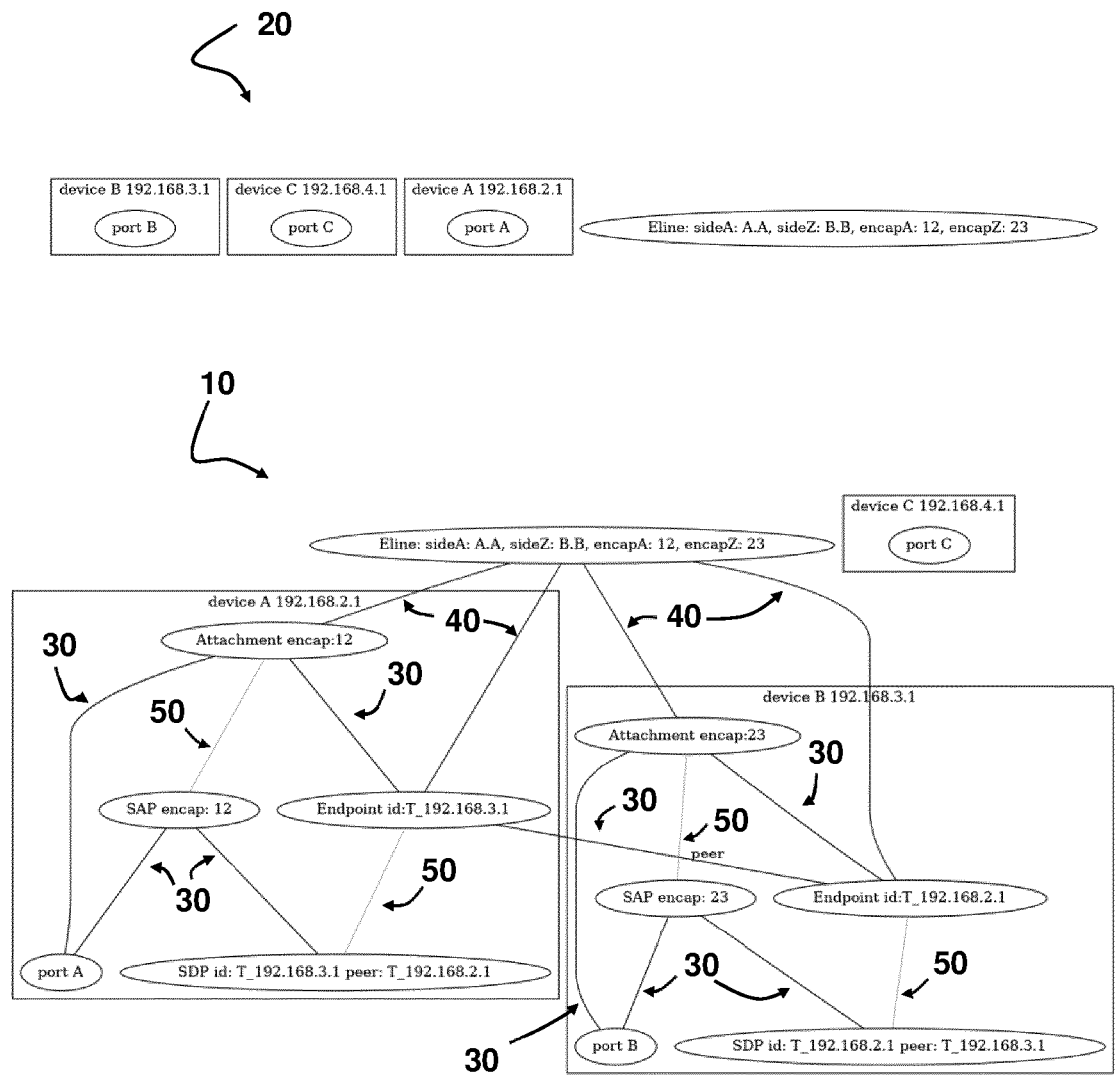
FIG. 5 shows a schematic diagram of an orchestrator model.

FIG. 5 shows a schematic diagram of an orchestration model 10. The multi-state desired state orchestration model can define types of intent (i.e. entities) and refinements of them into more concrete intents. Each entity can have attributes and relations with other entities. The refinement process is conditional on the attributes of the entity itself or any attribute of any entity directly or indirectly reachable via a relation.

For instance, consider the eline example (an eline is a Layer two connection stretched over long distances, typically used to connect e.g. branch offices to the HQ). As a service, towards the end-user, it has the properties SideA, SideZ (the two places to connect), encapA, encapZ (identifiers determining how the traffic will come out of the port at either side). In this model, there is also an inventory 20 of devices (which devices exist in the field). The attributes can be given in the entity. The relations are indicated by lines 30 between entities.

The first refinement breaks up the e-line in abstract components. The refinements are indicated by lines 40. The eline is refined in the setup of a pair of tunnel-endpoints with a specific ID which are each others peers and the attachment of a port to the endpoint, with the correct encap. One step further, there is refined to a specific type of physical device in the orchestration model 10, this refinement can be conditional on the type of device. The conditional refinement is indicated by lines 50. A tunnel endpoint can for example be an SDP. A tunnel attachment can for example be a SAP. The relation to the peer can become an attribute, as the device specific intents are limited to one physical device. In this example, the refinement and conditional refinement can be performed without the use of state machines.

When a state machine is attached to an entity X (at any level), the current state is presented as an entity, related to this entity X. The current state also has attributes. As such conditional refinement of this entity can be conditional on the attributes of its current state:

1) the parameters can be directly used in a condition (e.g. a third and fourth endpoint is added for high availability)
2) these parameters (or values derived from them) can be passed to other entities produced by refinement as attributes (i.e. the blue lines are the same). Here they can affect further refinement (green lines) or simply change the desired state through changed attributes. As such these entities do not need to have a state machine of their own to be affected by them.
3) these parameters (or values derived from them) can affect the refinement of other related entities.

The higher-level desired state can remain the same (for example, connection between A and B), but the way it refines into independent steps by means of lower-level modules, can be changed by a state change of the finite state machines of that module (or lower-level modules), triggered by events (e.g. external events of outside world).

Figure 6:
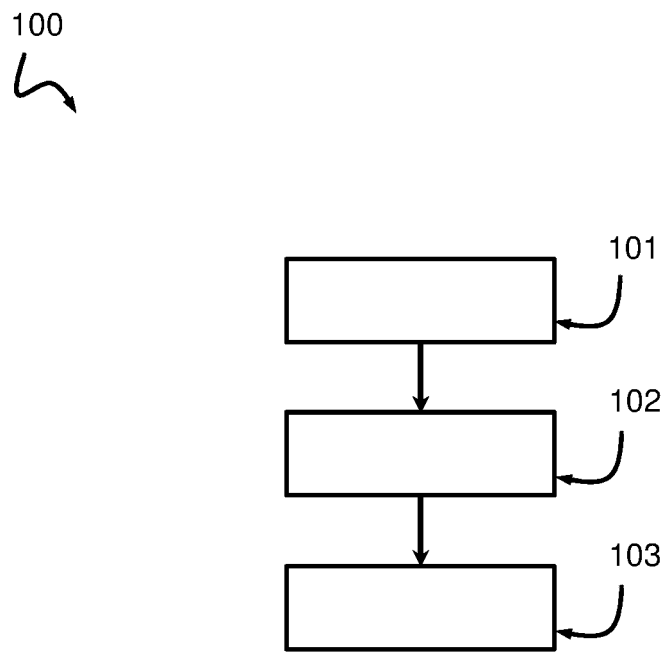
FIG. 6 shows a schematic diagram of a method.

FIG. 6 shows a schematic diagram of a method 100 for configuring a large-scale distributed infrastructure including multiple subsystems. In a first step 101, an orchestration system is provided including a declarative orchestration model for implementing desired states in the distributed infrastructure. The orchestration model is provided with a plurality of pre-defined modules each implementing a desired state, wherein modules with higher-level desired states are communicatively connected to modules with lower-level desired states, and wherein at least one subset of the lower-level desired states provides deployable configuration parameters for subsystems of the infrastructure. In a second step 102, at least one module of the orchestration model is coupled to a multi-state finite state machine including a list of desired states, the finite state machine being configured to be in one selected desired state of the list of desired states at any time. In a third step 103, events are monitored by means of the orchestration system, and a dynamic state transition of at least one finite state machine is performed from one desired state to another in response to one or more detected events triggering a transition condition.

The orchestration system may provide an integrated approach to configuration management to address the challenges that the management of contemporary distributed systems pose. The system can be integrated in the sense of: managing all configuration of a distributed system from a single integrated configuration model (cf. orchestration model); and/or integrating operations and development. The integrated configuration model (e.g. orchestration model) for a distributed system can be designed and developed similarly as software for the distributed system.

The configuration model can determine how the application and infrastructure it runs on are provisioned, deployed and configured. An integrated configuration model for contemporary distributed systems can be a relatively large configuration model.

The orchestration system may be a management tool offering an environment to describe a distributed system, wherein the configurations can be changed at a high level of abstraction. In this way, a mismatch between reasoning about the system in terms of its architecture and configuration can be reduced. The orchestration system be more cost effective in terms of manpower and can effectively reduce the risk of configuration errors.

A high-level service objective can be refined in sub-objectives in different lower-level layers. This can be represented in a graph of high-level objectives and lower-level objectives. Every module may be in a particular desired state. The lower-level layers may become increasingly concrete. For example, a connection between A and B is a high-level objective which may not exist physically, but can be subdivided into a number of sub-objectives in the lower-level modules in the orchestration model. The orchestration model can first be designed and subsequently executed using the orchestration system. The model may refine a high-level concept to lower-level sub-objectives by means of the plurality of modules and their interconnection.

According to the invention, state machines are linked to the refinement, such that a topology change can easily be implemented. As a result, the orchestration system can be made much more robust.

The orchestration system can integrate the management of all layers in the infrastructure in one management environment, from low level network equipment to components deployed in application containers. In this way, a significantly improved automation be achieved. Optionally, the orchestration system is configured to support dependency management between interdependent configuration parameters. In this way, duplication of configuration parameters can be reduced, since configuration reuse is enabled.

In some examples, the orchestration model includes one or more state machines that have two states, a first state when a file is present on a specified location and a second state when a file is not present on a specified location. Additionally or alternatively, the orchestration model may include more complex finite state machines.

The desired state mechanism of the orchestration system can ensure that automatic self-healing can be performed, since the orchestration system can at any time determine whether the actual current state corresponds to the desired state.

The configuration of subsystems may include various actions. For instance, a high-level objective may be defined by deploying of an application on an infrastructure by installing all its files at the correct locations defined by the developers and the vendor of the operating system and installing all the dependencies of the application. The orchestration system can be used for configuring the application by setting its configuration parameters to the desired values. Configuration files or databases (e.g. Windows registry) hold the values for the configuration parameters of an application. Installation of updates at runtime can evolve the configuration parameters to change how the application functions. The configuration of an application includes the selection and installation of software applications, as well as setting configuration parameters of the installed applications and the underlying infrastructure (operating system, firmware of devices, etc.). Configuration parameters can provide system administrators with the means to adapt the functionality of the software application to the actual deployment environment. For example, the configuration parameters to configure an IP address on a network interface such as the IP address and netmask. Whenever one configuration parameter is adjusted, it is to be ensured that all dependent parameters are updated to keep the configuration consistent. Additionally, in addition to configuration parameters of the application, also configuration parameters of the application's execution environment: operating system, network and storage equipment, printers, etc. may need to be configured.

The orchestration system may be configured to manage a distributed software system, which can include components deployed on multiple machines which communicate over the network. This distribution increases the interdependencies between configuration parameters because all distributed components need to function as a single application and thus all configuration parameters need to be consistent, e.g. a client-server relation between an application and the database server it uses. The configuration of a distributed system often involves low level artifacts such as files, system services and software packages, configuration statement.

The orchestration system can also configure virtual subsystems based on the information regarding the desired states. A virtual subsystem may include one or more virtual machines that run on one or more physical devices, the physical devices for example being coupled to one another using one or more physical switches. The orchestration system may determine whether the desired state of a module necessitates an actual change in the configuration of the one or more physical switches and/or parameters of the virtual subsystems. When the desired state necessitates a change in the configuration of the one or more physical switches and/or parameters of the virtual subsystems, the reconfiguration can be performed. In some examples, the desired state may result in a reconfiguration whereby the virtual machine is moved between one or more physical devices.

The orchestration system may enforce different quality of service policies in the infrastructure, by means of different desired states defined in the finite state machines linked to the modules of the orchestrator modules.

The invention employs state machines for allowing desired state changes during orchestration. The state machine can be coupled to a set of states or attributes. Advantageously, the desired states defined in the orchestrator model may change based on detected events, and may thus not be fixed. The state machines may have edges which are triggered in response to some events. The state machine will be in one desired state at any time. The state machine can guarantee that one desired state is set in an advantageous way. It will be appreciated that desired state models, not coupled to state machines, may inherently have no internal state. For any given high-level intent, a desire state model will always produce an identical set of low-level intents, notwithstanding changed circumstances.

The orchestrator may monitor events for detecting certain predefined events. These predefined events may for example be specified in the state machine edges in the orchestrator model. The edges in the one or more state machines in the orchestrator model may define the reactive response to the events. The events can be received by the orchestrator system in different ways, for instance by means of an event bus. It will be appreciated that an "event bus" may indicate a communication channel allowing notifications and/or events to be transmitted between systems, subsystems, servers, devices, etc.

It will be appreciated that "detected" event may also indicate that an entity is "notified" of an event and/or has "received" an event. Therefore, instead of monitoring events, the orchestrator system can also receive events, and/or be notified about events.

It will be appreciated that "layering" of the modules can indicate layers of abstraction, and can be interpreted broadly. The layering may not necessarily restrict that each layer is connected to a successive and/or preceding layer. For example, two modules of different abstraction layers can be located in a same refinement layer. One layer may include a subset of modules which are grouped together. This grouping may be performed or modeled based on different aspects.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet.

It will be appreciated that using a 'cloud' may involve acquiring computational/network/storage resources and higher computation services (like database services) over the internet.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. An orchestration system for configuring a large-scale distributed infrastructure comprising multiple subsystems;
   wherein the orchestration system includes a declarative orchestration model for implementing desired states in the large-scale distributed infrastructure,
   wherein the orchestration model includes a plurality of pre-defined modules each implementing a desired state, wherein modules with higher-level desired states are communicatively connected to modules with lower-level desired states, and wherein at least one subset of the lower-level desired states provides deployable configuration parameters for subsystems of the large-scale distributed infrastructure;
   wherein at least one module of the plurality of pre-defined modules of the orchestration model is coupled to a multi-state finite state machine comprising a list of states, the multi-state finite state machine configured to be in one selected state of the list of states at any time;
   wherein each multi-state finite state machine carries with it at least one set of service attributes, which serve as input to the orchestration model coupled to that multi-state finite state machine; and
   wherein the orchestration system is configured to monitor events, and to perform a dynamic state transition of at least one multi-state finite state machine from one desired state to another in response to one or more detected events triggering a transition condition,
   wherein the plurality of pre-defined modules are arranged in successive layers for refining the higher-level desired states into the lower-level desired states, wherein a desired state of a particular module in a higher layer is refined into one or more desired states of modules in a successive lower level, the modules in the higher layer with a higher-level desired state than the modules in the successive lower layer, and wherein at least one subset of the lower-level desired states provides the deployable configuration parameters for services and/or subsystems of the infrastructure, and whereby a refinement is conditional to a current state and attribute sets of any of the coupled multi-state finite state machines, wherein a same higher-level desired state is refinable into different lower-level desired states in response to a triggered transition of an associated finite state machine that changes underlying conditions for the refinement.

2. The system according to claim 1, wherein a transition of the current state of each multi-state finite state machine to a new state is reactive to an external event detected by the orchestration system or an internal event comprising at least one of a completion or a failure to make effective at least parts of the current state.

3. The system according to claim 2, wherein the orchestration system includes one or more application programming interfaces, wherein the orchestration system is configured such that state-transitions of each multi-state finite state machine are triggered by one or more application programming interfaces calls, wherein the calls are configured to manipulate one of the sets of service attributes associated with the multi-state finite state machine.

4. The system according to claim 1, wherein the dynamic state transitions are to cause the sets of service attributes to be manipulated in a pre-defined way.

5. The system according to claim 1, wherein a network service is executed on the large-scale distributed infrastructure, wherein the network service is operable using detected events which are communicated to the orchestration system.

6. The system according to claim 1, wherein different states of the list of states of each multi-state finite state machine represent different stages of a deployment lifecycle of a network service.

7. The system according to claim 1, wherein each multi-state finite state machine is configured to provide a rollback functionality, wherein in response to a rollback event, each multi-state finite state machine is configured to perform a rollback transition by moving to a next state in the multi-state finite state machine, wherein inputs to the particular module to which said multi-state finite state machine is coupled to are restored to stored inputs.

8. The system according to claim 7, wherein the rollback event is met when at least one step in a transition campaign carried out on the orchestration model fails.

9. The system according to claim 1, wherein the orchestration system is configured to perform a validity check when a transition is initiated, wherein the orchestration system is configured to check whether the transition to the desired state is allowable.

10. The system according to claim 1, wherein the orchestration model is reconfigurable.

11. The system according to claim 1, wherein the plurality of pre-defined modules of the orchestration model are reconfigurable, wherein at least the list of states and conditions for the dynamic state transitions defined by the multi-state finite state machines coupled to the plurality of pre-defined modules of the orchestration model are adjustable.

12. The system according to claim 1, wherein the orchestration system is adapted to manage at least one of: a large-scale telecommunications infrastructure, a cloud infrastructure, a web-service infrastructure, or a database infrastructure.

13. A method for configuring a large-scale distributed infrastructure comprising multiple subsystems, the method comprising:

providing an orchestration system comprising a declarative orchestration model for implementing desired states in the distributed infrastructure, wherein the orchestration model is provided with a plurality of pre-defined modules each implementing a desired state, wherein modules with higher-level desired states are communicatively connected to modules with lower-level desired states, and wherein at least one subset of the lower-level desired states provides deployable configuration parameters for subsystems of the distributed infrastructure;

coupling at least one module of the orchestration model to a multi-state finite state machine comprising a list of desired states, each multi-state finite state machine configured to be in one selected desired state of the list of desired states at any time, wherein each multi-state finite state machine carries at least one set of service attributes, which serve as input to the orchestration model coupled to that multi-state finite state machine; and monitoring events using the orchestration system, and performing a dynamic state transition of at least one multi-state finite state machine from one desired state to another in response to one or more detected events triggering a transition condition, wherein the plurality of pre-defined modules are arranged in successive layers for refining higher-level desired states into lower-level desired states, wherein a desired state of a particular module in a higher layer is refined into one or more desired states of modules in a successive lower level, the modules in the higher layer with a higher-level desired state than the modules in the successive lower layer, and wherein at least one subset of the lower-level desired states provides the deployable configuration parameters for services and/or subsystems of the infrastructure, and whereby a refinement is conditional to a current state and attribute sets of any of the coupled multi-state finite state machines, wherein a same high-level desired state is refinable into different lower-level desired states in response to a triggered transition of an associated finite state machine that changes underlying conditions for the refinement.

14. A non-transitory machine-readable medium comprising instructions that, when executed, cause a machine to perform the method according to claim 13.

15. A device for configuring a large-scale distributed infrastructure comprising multiple subsystems, the device comprising a computing unit comprising a processor coupled to a memory operable to cause the computing unit to carry out the method according to claim 13.

* * * * *